US012798271B2

(12) United States Patent
Yamada

(10) Patent No.: US 12,798,271 B2
(45) Date of Patent: Nov. 17, 2026

(54) ROLL PAPER PRINTER

(71) Applicant: SEIKO EPSON CORPORATION, Tokyo (JP)

(72) Inventor: Koji Yamada, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 109 days.

(21) Appl. No.: 18/751,823

(22) Filed: Jun. 24, 2024

(65) Prior Publication Data

US 2025/0001776 A1 Jan. 2, 2025

(30) Foreign Application Priority Data

Jun. 27, 2023 (JP) ................................ 2023-104809

(51) Int. Cl.
*B41J 15/04* (2006.01)
*B41J 11/70* (2006.01)

(52) U.S. Cl.
CPC ............. *B41J 15/046* (2013.01); *B41J 11/70* (2013.01)

(58) Field of Classification Search
CPC ......... B41J 15/046; B41J 11/70; B41J 15/042
See application file for complete search history.

(56) References Cited

U.S. PATENT DOCUMENTS 6,652,173 B1 * 11/2003 Martini .................. B41J 11/703 400/621
6,964,475 B2 * 11/2005 Nebashi ................... B41J 2/325 347/101
8,177,232 B2 * 5/2012 Supron .................. B65H 29/14 271/279
8,882,376 B2 * 11/2014 Yoshioka ............. B41J 11/0045 400/621
2025/0051124 A1 * 2/2025 Yamada ................. B65H 29/56

FOREIGN PATENT DOCUMENTS

JP 2000143054 A * 5/2000
JP 2002179263 A * 6/2002
JP 3736528 B2 * 1/2006 ........... B65H 3/0638
JP 2008-068950 A 3/2008

* cited by examiner

*Primary Examiner* — Christle I Marshall
(74) *Attorney, Agent, or Firm* — WORKMAN NYDEGGER

(57) ABSTRACT

A roll paper printer includes: a cover configured to open and close a case; a platen roller configured to pull out paper from a roll paper stored in the case and convey the paper in a conveyance direction; a head configured to print on the paper at a position facing the platen roller; a cutter configured to cut the paper at a position downstream of the head in the conveyance direction; and a paper guide mounted on the cover, and the paper guide includes a first guide configured to guide a first surface of the paper, a roller configured to guide a second surface opposite to the first surface of the paper at a position facing the first guide, and a support portion configured to movably support a shaft of the roller.

6 Claims, 6 Drawing Sheets

ROLL PAPER PRINTER

The present application is based on, and claims priority from JP Application Serial Number 2023-104809, filed Jun. 27, 2023, the disclosure of which is hereby incorporated by reference herein in its entirety.

BACKGROUND

1. Technical Field

The present disclosure relates to a roll paper printer.

2. Related Art

As disclosed in JP-A-2008-68950, a printer that performs printing using roll paper and includes a cutting blade that cuts paper and a sheet discharge guide installed at a paper discharge port is known.

JP-A-2008-68950 is an example of the related art.

In the above-described printer, there is a possibility that the cut and discharged sheet drops from the sheet discharge guide.

SUMMARY

A roll paper printer to solve the above includes: a cover configured to open and close a case; a platen roller configured to pull out paper from a roll paper stored in the case and convey the paper in a conveyance direction; a head configured to print on the paper at a position facing the platen roller; a cutter configured to cut the paper at a position downstream of the head in the conveyance direction; and a paper guide mounted on the cover, and the paper guide includes a first guide configured to guide a first surface of the paper, a roller configured to guide a second surface opposite to the first surface of the paper at a position facing the first guide, and a support portion configured to movably support a shaft of the roller.

DESCRIPTION OF EMBODIMENTS

1. Embodiment

1-1. Configuration of Roll Paper Printer

Figure 1:
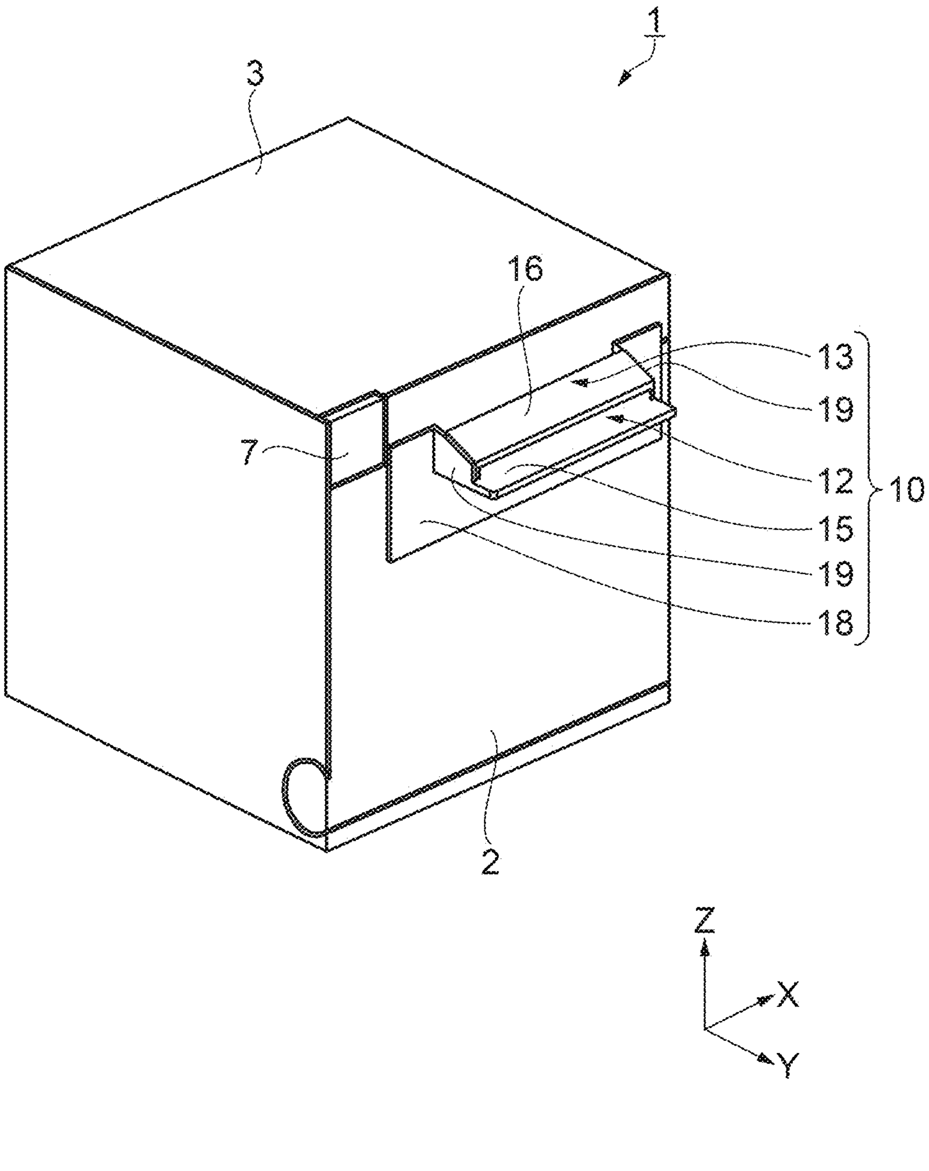
FIG. 1 is a perspective view of a roll paper printer.

Hereinafter, the configuration of the roll paper printer according to the embodiment will be described with reference to FIGS. 1 to 9. The directions in the drawing will be described using a three-dimensional coordinate system. For convenience of description, a positive direction of a Z-axis is referred to as an upward direction, an upward side, or simply referred to as an up, a negative direction is referred to as a downward direction, a downward side, or simply referred to as a down, a positive direction of an X-axis is referred to as a rightward direction, a rightward side, or simply referred to as a right, a negative direction is referred to as a leftward direction, a leftward side, or simply referred to as a left, a positive direction of a Y-axis is referred to as a forward direction, a front side, or simply referred to as a forward, and a negative direction is referred to as a backward direction, a rear side, or simply referred to as a backward.

A roll paper printer 1 shown in FIG. 1 is used to print receipts in a POS (Point Of Sale) system, for example.

The roll paper printer 1 includes a case 3 that can store roll paper R described below, and a cover 2 that can open and close the case 3. The cover 2 can be locked to the case 3 by a lock mechanism 7.

A paper guide 10 that guides a first paper P1 described later is mounted on the cover 2. The paper guide 10 has a first opening 11 (described later) through which the first paper P1 is inserted from the rear, a second opening 12 through which the first paper P1 is ejected forward, and a third opening 13 through which the first paper P1 can be ejected upward, which is different from forward, when the first paper P1 cannot be ejected from the second opening 12.

The paper guide 10 also includes a first guide 15 that can guide the first paper P1 from below, a second guide 16 that covers a roller 17 described below from above, side plates 19 that can guide the first paper P1 from the left and right, and a mounting plate 18 that attaches the paper guide 10 to the cover 2.

The mounting plate 18 may be integrally molded with the cover 2 by a resin or the like, or may be fixed to the cover 2 by a double-sided tape, an adhesive, or the like. The mounting plate 18 may be detachably attached to the cover 2 with screws or the like.

Figure 2:
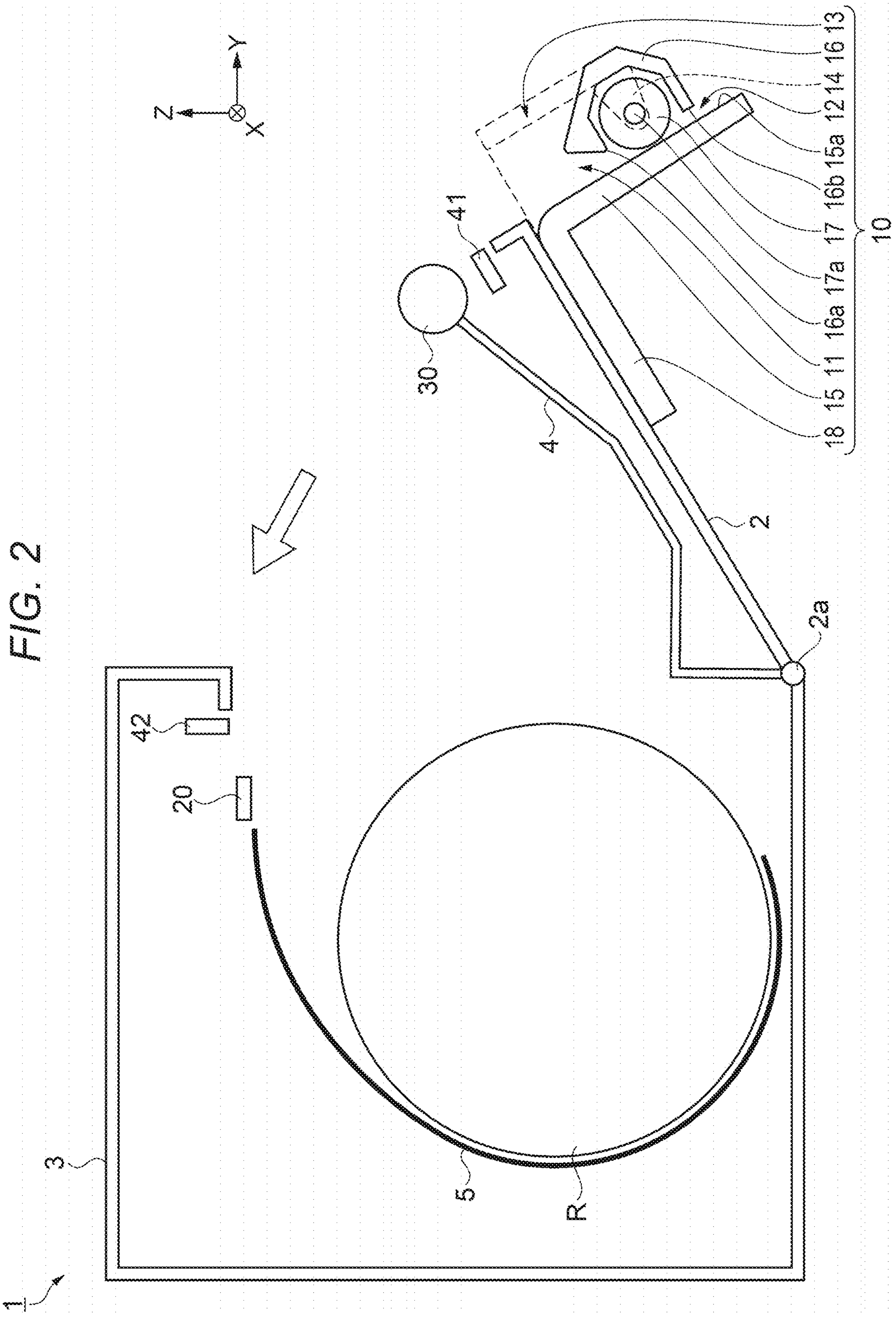
FIG. 2 is a cross-sectional view illustrating the configuration of the roll paper printer when a cover is open.

As shown in FIG. 2, the cover 2 is rotatable about a hinge 2*a* of the case 3. The operator of the POS system can open the cover 2 and store the roll paper R in the case 3.

In addition to the paper guide 10, a platen roller 30, a first blade 41 constituting a cutter 40 described below, and a first roll paper guide 4 are mounted on the cover 2.

A head 20, a second blade 42 constituting the cutter 40, and a second roll paper guide 5 are disposed in the case 3.

Figure 3:
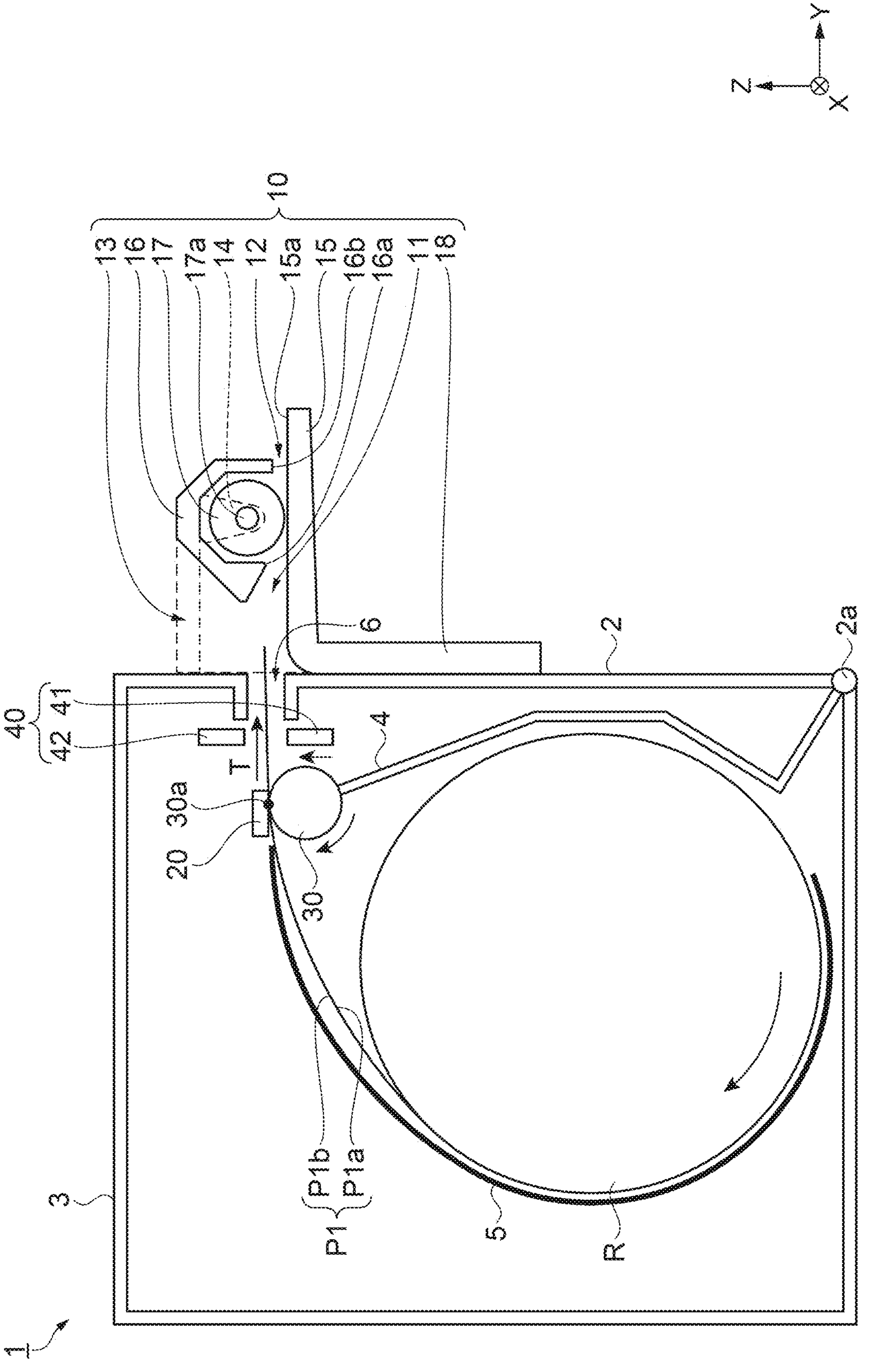
FIG. 3 is a cross-sectional view illustrating the configuration of the roll paper printer when the cover is closed.

As shown in FIG. 3, when the cover 2 is closed, the platen roller 30 and the head 20, and the first blade 41 and the second blade 42 of the cutter 40, are positioned to face each other, respectively. The cutter 40 is located downstream of the platen roller 30 and the head 20 in a conveyance direction T described below.

When the cover 2 is closed, a rectangular paper discharge port 6 is formed between the cover 2 and the case 3. The roll paper R is rotatably supported by the first roll paper guide 4 of the cover 2 and the second roll paper guide 5 of the case 3.

The platen roller 30 is formed in a cylindrical shape from a flexible resin material such as rubber. The platen roller 30 and the head 20 hold the first paper P1 at a nip position 30*a*.

The platen roller 30 conveys the first paper P1 using a friction feed method that conveys the first paper P1 using friction. The platen roller 30 is a so-called conveyance roller that conveys the first paper P1. The platen roller 30 rotates clockwise, pulls out the first paper P1 from the roll paper R stored in the case 3, and conveys the first paper P1 in the conveyance direction T. At this time, the roll paper R also rotates clockwise.

The first paper P1 and a second paper P2, which will be described later, wound around the roll paper R and pulled out from the roll paper R are collectively referred to as a paper P.

The head 20 is, for example, a line thermal head. The head 20 has a pressing mechanism (not shown) that presses the platen roller 30. The first paper P1 at the nip position 30*a* is sandwiched between the platen roller 30 and the head 20 at a specific pressure by the pressing mechanism.

The paper P is, for example, a long thermal paper. A first face Pla of the first paper P1 is a conveyance surface conveyed by the platen roller 30. A second face P1*b*, which is a surface opposite to the first face Pla of the first paper P1, is a printing surface to which a color former is applied.

While the first paper P1 is conveyed, the first face Pla thereof is in contact with the platen roller 30, the second face P1*b* of the first paper P1 contacts the head 20 at the nip position 30*a*, and the first paper P1 is colored by heat generated by the head 20 for printing. The paper P is wound around the roll paper R such that the outer side thereof is the printing surface.

The roll paper printer 1 includes a control unit (not shown). The control unit includes a central processing unit (CPU) that controls parts of the roll paper printer 1, and memory that stores programs such as firmware. The CPU is also referred to as a processor. The CPU can read and execute the firmware from the memory.

The control unit can control conveyance of the first paper P1 by the platen roller 30, printing by the head 20, and cutting by the cutter 40.

The first paper P1 conveyed by the platen roller 30 in the conveyance direction T and discharged from the paper discharge port 6 enters the first opening 11 that is the entrance of the paper guide 10.

In the paper guide 10, the roller 17 is at a position facing the first guide 15. The first face Pla of the first paper P1 entering the first opening 11 is guided from below by the first guide 15, and the second face P1*b* is guided from above by the roller 17.

The upper side of the first opening 11 of the paper guide 10 is defined by a first cylinder 16*a* of the second guide 16, and the lower side thereof is defined by the first guide 15.

The third opening 13 is provided above the first guide 15 between the paper discharge port 6 and the first opening 11. The third opening 13 communicates with the paper discharge port 6 and the first opening 11. The front side of the third opening 13 is defined by the second guide 16, and the rear side thereof is defined by the case 3.

The second opening 12, which is an outlet of the paper guide 10 for the first paper P1, communicates with the first opening 11 in the forward direction, which is the conveyance direction T. The first paper P1 is conveyed in the conveyance direction T by the platen roller 30, enters from the first opening 11 of the paper guide 10, and exits from the second opening 12. As described below, at this time, the first paper P1 is pushed from above by the roller 17 with a pressing force W.

The vertical direction of the second opening 12 is defined by a second cylinder 16*b* of the second guide 16 and the first guide 15. The left-right direction of the first opening 11 and the second opening 12 is defined by the side plates 19.

A portion of the first guide 15 that contacts the first paper P1 is formed as a flat surface in the front-rear and left-right directions. The first guide 15 is made of, for example, a resin such as polyethylene.

In the first guide 15, at least a portion that comes into contact with the first paper P1 is covered with, for example, a sheet 15*a* containing ultra high molecular weight polyethylene.

The ultra high molecular weight polyethylene has a molecular weight increased to 1,000,000 to 7,000,000 when the molecular weight of ordinary polyethylene is 20,000 to 300,000. The sheet 15*a* made of ultra high molecular weight polyethylene can reduce friction with a material in contact with the sheet 15*a* as compared with polyethylene or the like. In addition, compared to polyethylene or the like, the sheet 15*a* made of ultra high molecular weight polyethylene can suppress static electricity generated between the sheet 15*a* and the material in contact with each other, and can further reduce friction. The sheet 15*a* containing ultra high molecular weight polyethylene is also referred to as a so-called low friction sheet.

As described later, the coefficient of friction of the sheet 15*a* is smaller than the coefficient of friction of the paper P. Accordingly, the frictional force between the sheet 15*a* and the paper P is smaller than the frictional force between the papers P.

The first guide 15 can guide the first face Pla of the first paper P1. The roller 17 can guide the second face Pib, which is the opposite face of the first face Pla of the first paper P1, at a position facing the first guide 15.

The first paper P1 can be guided and held by the first guide 15 and the roller 17.

The second guide 16 is disposed opposite to and above the first guide 15 with respect to the roller 17. On a roller 17 side of the second guide 16, a plurality of arc-shaped ribs along the circumference of the roller 17 may be provided so as to press the roller 17 bounced upward.

The roller 17 is made of resin such as plastic or rubber and formed in a columnar shape. The roller 17 is rotatable about a shaft 17*a* by contacting the first paper P1 entering from the first opening 11.

The roller 17 may be configured with a plurality of rollers, and a ring-shaped rib may be partially provided on the circumference. The roller 17 configured as described above can contact the first paper P1 in a balanced manner in the paper width direction.

A support portion 14 has an arc shape on the lower side on the first guide 15 side, and has a groove or an elongated hole that is extending in the upper side in a direction away from the first guide 15. The support portion 14 having such a shape can movably support the shaft 17*a*. The support portion 14 can also smoothly move the roller 17 pushed by the first paper P1 and the shaft 17*a* while contacting the shaft 17*a*.

The support portions 14 are provided at left and right positions of the shaft 17*a* and can support the shaft 17*a*. The support portion 14 may be provided on the first guide 15 or the second guide 16. The support portion 14 may be integrally molded with the first guide 15 or the second guide 16 using resin. The support portion 14 may be provided on the side plate 19. In this case, the side plate 19 may be integrally molded with the first guide 15 or the second guide 16 using resin.

In the case where the support portion 14 is provided on the first guide 15 and the support portion 14 has a groove shape, the roller 17 can be easily inserted into the support portion 14 from above. In this case, the support portion 14 is configured to rise upward from the first guide 15.

On the other hand, when the support portion 14 is provided on the second guide 16, the support portion 14 and the second guide 16 can be handled by a unit to which the roller 17 is assembled. For example, the support portion 14 and the second guide 16 can be more easily assembled or replaced with a unit in which the roller 17 is assembled with respect to the first guide 15. In this case, the support portion 14 is configured to extend downward from the second guide 16.

When the first paper P1 is conveyed in the conveyance direction T from the first opening 11 of the paper guide 10 through the second opening 12 by the platen roller 30, the first paper P1 passed out from the second opening 12 may be pressed or gripped by the operator or customer operating the POS system.

In this case, the first paper P1 in the paper guide 10 cannot exit from the second opening 12, while the first paper P1 that is continuously conveyed enters from the first opening 11. As a result, the first paper P1 may be jammed in the paper guide 10.

The paper guide 10 has the third opening 13 communicating with a rear upper side of the first opening 11. When the first paper P1 cannot exit from the second opening 12 due to an operator or a customer pressing the first paper P1 or the like, the first paper P1 can be output to the third opening 13 in a direction different from that to the second opening 12.

That is, the first paper P1 newly entering from the first opening 11 can exit from the third opening 13 in the upward direction different from the conveyance direction T. The third opening 13 can release the first paper P1 that cannot be discharged from the second opening 12.

1-2. Operation of Main Part of Paper Guide 10

Next, operations of main parts of the paper guide 10 will be described with reference to FIGS. 4 to 9.

Figure 4:
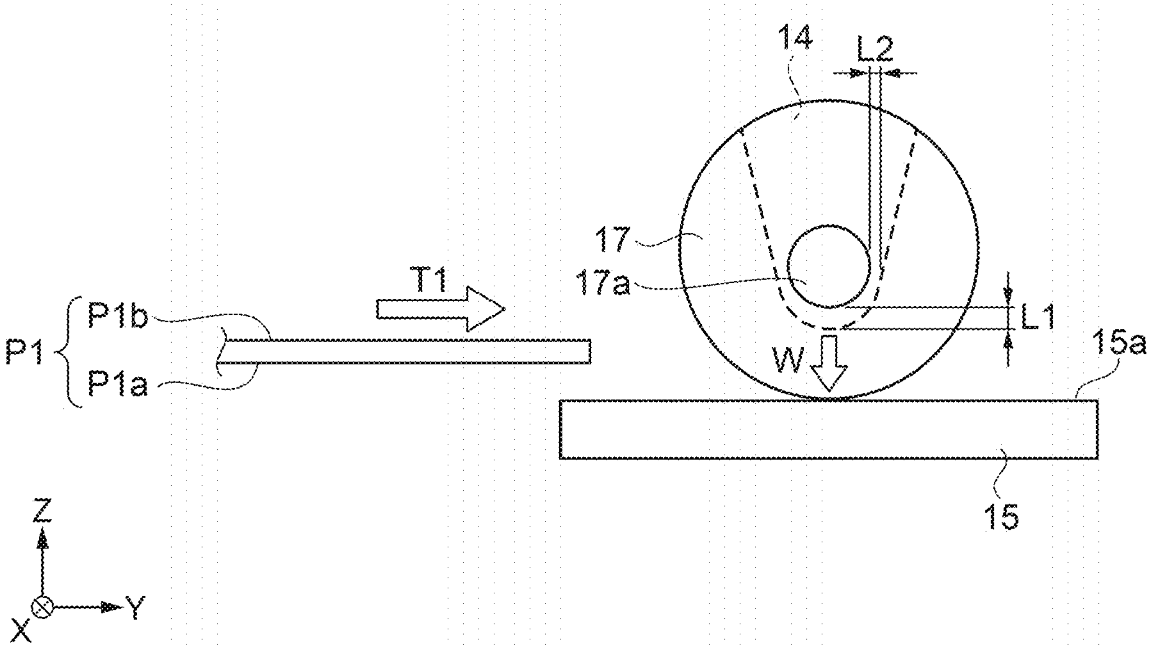
FIG. 4 is a cross-sectional view illustrating a main part of a paper guide.

As shown in FIG. 4, the first paper P1 discharged from the paper discharge port 6 (not shown) is conveyed in a conveyance direction T1 and goes between the roller 17 and the first guide 15. Note that the first paper P1 is before being cut by the cutter 40, and is conveyed in the conveyance direction T1 by the platen roller 30 (not shown) located behind the roller 17 and the first guide 15.

The roller 17 is in contact with the first guide 15 via the sheet 15*a* and presses the first guide 15 with the pressing force W. In this case, the pressing force W is generated by the weight of the roller 17 including the shaft 17*a*.

The pressing force W may be generated by a spring, rubber, or the like (not shown) via the roller 17. The pressing force W is preferably in a range of 5 gf to 15 gf, and more preferably 7 gf. For example, an outer diameter of the roller 17 is 7 mm, and an outer diameter of the shaft 17*a* is 3 mm.

When the roller 17 is in contact with the first guide 15 via the sheet 15*a*, the shaft 17*a* of the roller 17 can have a gap of a distance L2 in each of the front and the rear in the support portion 14, and a gap of a distance L1 in the lower part can be provided. For example, the distance L2 is preferably 0.5 mm, and the distance L1 is preferably 1 mm.

The shaft 17*a* is movable in front of and behind the support portion 14 by the distance L2. Because the shaft 17*a* is separated by the distance L1 from below the support portion 14, the shaft 17*a* can float from the support portion 14 together with the roller 17, and the roller 17 can reliably press the first paper P1 with the pressing force W as described below.

When the roller 17 is in contact with the first guide 15 via the sheet 15*a*, the shaft 17*a* can be separated from the support portion 14 by the distance L1 and the distance L2, and thus, as shown in FIG. 4, the shaft 17*a* may not be in contact with the support portion 14.

The support portion 14 has a so-called U-shape. A portion of the support portion 14 on a first guide 15 side located below has an arc shape in accordance with the shape of the shaft 17*a*.

The support portion 14 has a front-upward slope extending upward in the forward direction and a rear-upward slope extending upward in the rearward direction from the lower arc-shaped portion. The front-upward slope is also referred to as a first slope, and the rear-upward slope is also referred to as a second slope. The two slopes extend obliquely upward so as to be separated from each other before and after the arc-shaped portion of the support portion 14. That is, the two slopes are slightly obliquely opposed to each other and have a shape spreading upward from the arc-shaped portion.

In the U-shape, the surface extending upward may not be a slope. For example, it may be configured by a vertical surface extending vertically upward, or may be configured by combining the slope and the vertical surface.

With the support portion 14 having such a configuration, the shaft 17*a* of the roller 17 can freely move within a range of the support portion 14. When the shaft 17*a* comes into contact with the support portion 14, the shaft 17*a* can smoothly move along one of the two slopes. The roller 17 can also move in the same manner as the shaft 17*a* together with the shaft 17*a*.

Figure 5:
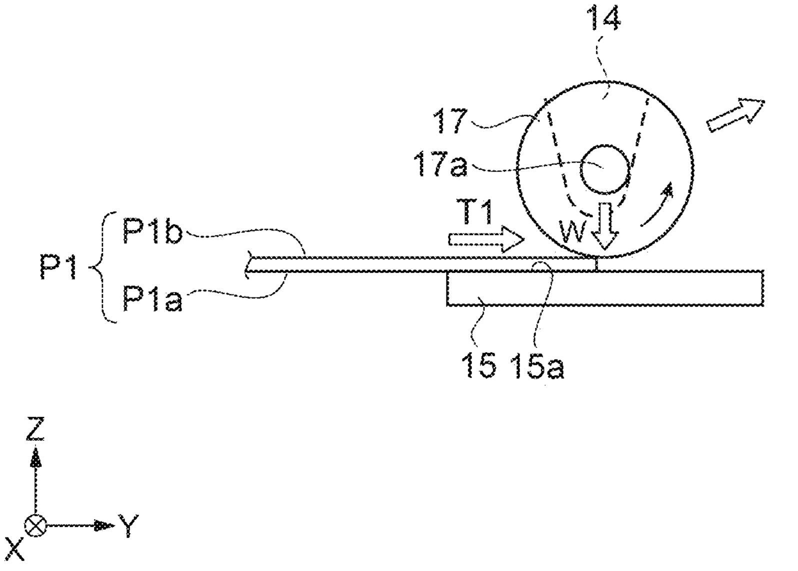
FIG. 5 is a cross-sectional view illustrating the main part of the paper guide when a first paper enters the paper guide.

When the first paper P1 shown in FIG. 4 is further conveyed in the conveyance direction T1, the leading end of the first paper P1 enters between the roller 17 and the first guide 15 as shown in FIG. 5.

The roller 17 contacts the leading end of the first paper P1 and is pushed by the first paper P1 to move forward and upward. The roller 17 can also press the first paper P1 with the pressing force W while rotating counterclockwise. At this time, the shaft 17*a* of the roller 17 also moves front-upward direction. The shaft 17*a* can smoothly move front-upward direction together with the roller 17 along the front-upward slope while being in contact with the front-upward slope of the support portion 14.

Because the support portion 14 movably supports the shaft 17*a* of the roller 17 in this way, the shaft 17*a* can be smoothly moved together with the roller 17 by the first paper P1 being conveyed.

The roller 17 is pushed by the leading end of the first paper P1 and moves so as to float while rotating. As a result, the leading end of the first paper P1 can easily slip under the roller 17. That is, the load when the leading end of the first paper P1 enters between the first guide 15 and the roller 17 is reduced by the support portion 14 configured as described above, and it can easily enter.

Specifically, as shown in FIG. 4, when the roller 17 contacts the first guide 15 via the sheet 15*a*, the shaft 17*a* of the roller 17 can be located at a position where the shaft 17*a* does not contact the support portion 14. At this time, as described above, the distance L1 and the distance L2 cause a gap such that the shaft 17*a* does not come into contact with the support portion 14.

As shown in FIG. 5, the first paper P1 enters between the roller 17 and the first guide 15, and the roller 17 contacts the first paper P1. At this time, due to this gap, the shaft 17*a* and the roller 17 can move in the front-rear and up-down directions. As a result, the first paper P1 can easily slip under the roller 17, and the roller 17 can press the first paper P1 with the pressing force W due to its own weight.

Figure 6:
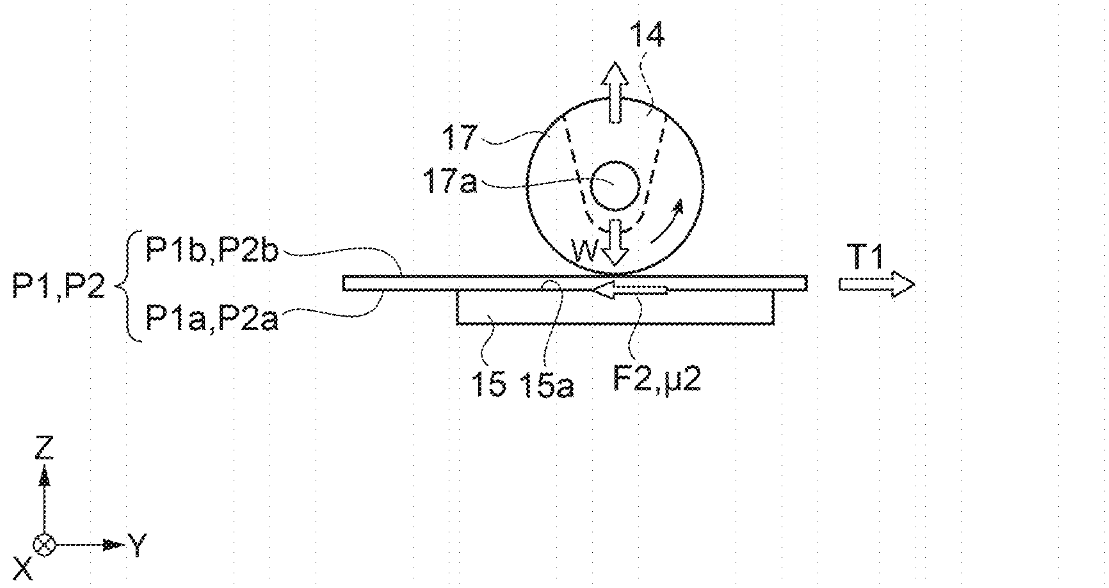
FIG. 6 is a cross-sectional view illustrating the main part of the paper guide when the first paper is held by the paper guide.

When the first paper P1 shown in FIG. 5 is further conveyed in the conveyance direction T1, as shown in FIG. 6, the first paper P1 moves while being pressed by the roller 17 by the pressing force W and being guided by the roller 17 and the first guide 15. The first paper P1 is cut a specific length by the cutter 40 located behind the roller 17 and the first guide 15. For example, when the first paper P1 is issued as a receipt, the predetermined length is about 70 mm. Depending on the printed content such as the number of products to be purchased, the receipt may be shorter than 70 mm or longer than 70 mm.

Hereinafter, the first paper P1 before being cut by the cutter 40 is referred to as the first paper P1 as it is, and the first paper P1 that has been cut into a piece of paper is also referred to as the second paper P2.

The roller 17 is pushed by the first paper P1 between the roller 17 and the first guide 15, and moves upward by the thickness of the first paper P1 with respect to the position shown in FIG. 4. At this time, the shaft 17*a* of the roller 17 also moves upward by the thickness of the first paper P1 in the support portion 14 with respect to the position shown in FIG. 4. The thickness of the first paper P1 is, for example, in the range of 50 μm to 90 μm.

Although FIG. 6 illustrates a case where the shaft 17*a* is not in contact with the support portion 14, the shaft 17*a* may be in contact with the first slope or the second slope of the support portion 14.

Here, a friction coefficient between a first face P2*a* of the second paper P2 and the sheet 15*a* of the first guide 15 is defined as a second friction coefficient μ2. When the second paper P2 is moved in the conveyance direction T1, a second frictional force F2 due to the second friction coefficient μ2 is generated in a direction opposite to the conveyance direction T1 between the first face P2*a* of the second paper P2 and the sheet 15*a*.

The second frictional force F2, the second friction coefficient μ2, and the pressing force W by the roller 17 have a relationship of F2=μ2×W. That is, the second frictional force F2 is a value obtained by multiplying the second friction coefficient μ2 by the pressing force W. The second friction coefficient μ2 is preferably in the range of 0.05 to 0.2, and more preferably 0.1.

The second paper P2 can be held by being pressed by the roller 17 with the pressing force W while being sandwiched between the first guide 15 and the roller 17. Further, the second frictional force F2 acting in the opposite direction to the conveyance direction T1, which is the direction in which the second paper P2 drops, is generated. As a result, the second paper P2 is prevented from dropping from the first guide 15.

For example, the second paper P2 printed by the head 20, cut by the cutter 40, and issued as a receipt can be held by the pressing force W of the roller 17 when placed on the first guide 15. The operator or customer can easily take out the second paper P2, which is a receipt held without dropping from the first guide 15.

Figure 7:
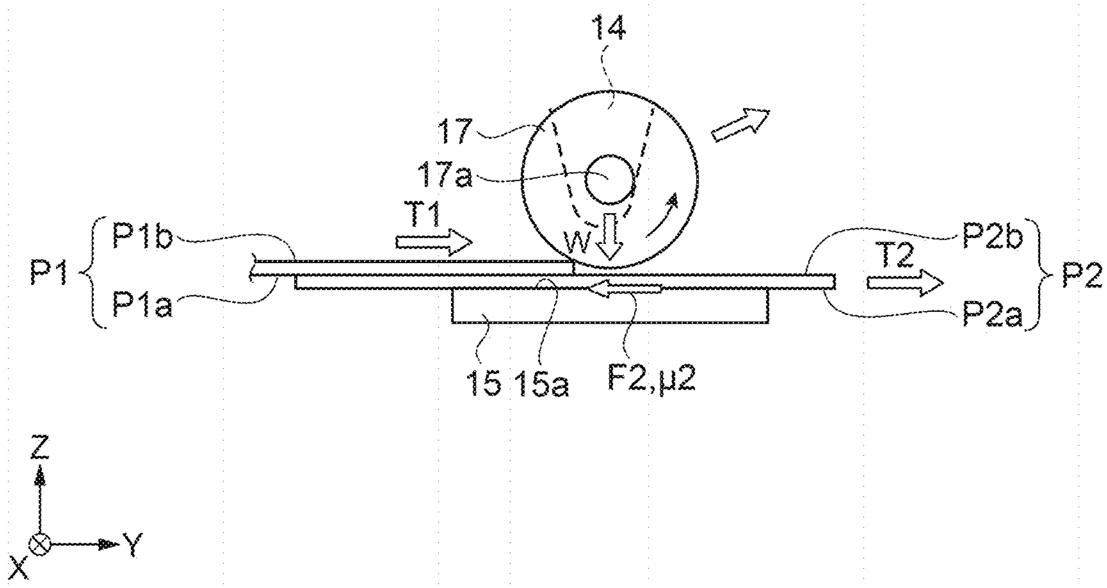
FIG. 7 is a cross-sectional view illustrating the main part of the paper guide when the first paper enters the paper guide while overlapping the second paper.

FIG. 7 shows a case where the next first paper P1 is conveyed in a state where the second paper P2 placed on the first guide 15 is not taken out and remains.

The next first paper P1 discharged from the paper discharge port 6 is conveyed in the conveyance direction T1 by the platen roller 30. The leading end of the first paper P1 enters between the roller 17 and the first guide 15 while overlapping the second paper P2 placed on the first guide 15.

The roller 17 contacts and is pushed by the leading end of the first paper P1, and is lifted upward while moving further forward. The roller 17 can also press the overlapping first paper P1 and second paper P2 with the pressing force W while rotating counterclockwise.

At this time, the shaft 17*a* of the roller 17 also moves further forward and upward direction. The shaft 17*a* can move smoothly together with the roller 17 along the front upper slope while being in contact with the front upper slope of the support portion 14.

Because the support portion 14 movably supports the shaft 17*a* of the roller 17 in this way, the first paper P1 conveyed overlapping the second paper P2 can move the shaft 17*a* smoothly together with the roller 17. In other words, the support portion 14 can support the roller 17 while freely moving the roller 17 together with the shaft 17*a* even when the next first paper P1 overlaps the second paper P2.

The roller 17 is pushed by the leading end of the first paper P1 and moves so as to float while rotating. As a result, the leading end of the first paper P1 can easily slide under the roller 17 while overlapping the second paper P2. That is, the support portion 14 configured as described above reduces the load when the leading end of the first paper P1 enters between the first guide 15 and the roller 17 while overlapping the second paper P2, and it can easily enter between the first guide 15 and the roller 17.

Figure 8:
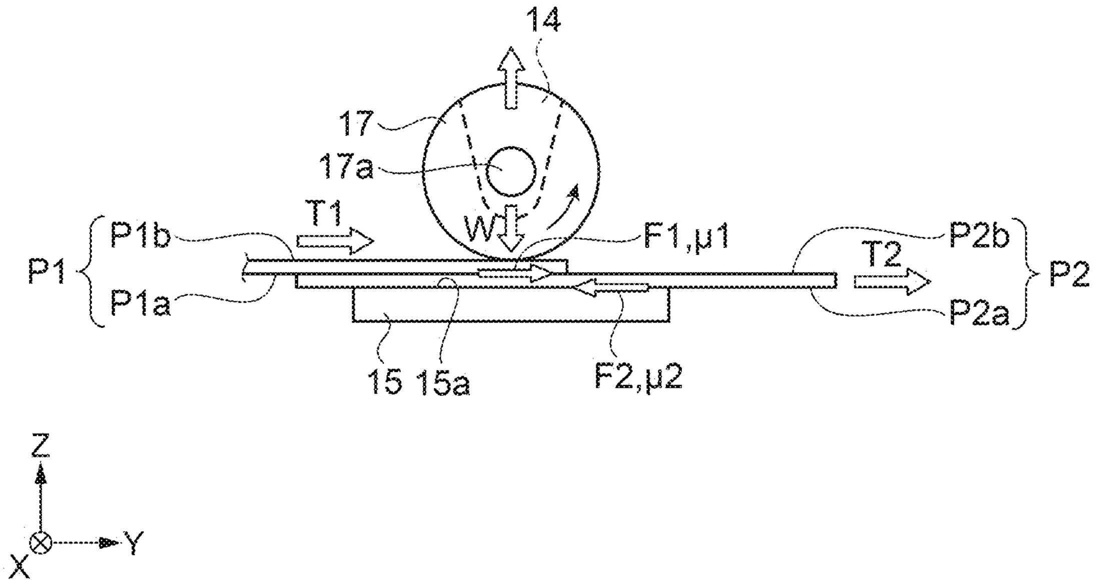
FIG. 8 is a cross-sectional view illustrating the main part of the paper guide when the first paper pushes and moves the second paper.

As shown in FIG. 8, when the next first paper P1 is further conveyed in the conveyance direction T1, the first paper P1 is conveyed while overlapping the second paper P2 and being sandwiched between the roller 17 and the first guide 15. The roller 17 is pushed by the first paper P1 and second paper P2 and moves upward direction by the thicknesses of the first paper P1 and the second paper P2.

The first paper P1 and the second paper P2 are sandwiched between the roller 17 and first guide 15, and the pressing force W of the roller 17 is applied. At this time, the first paper P1 conveyed in the conveyance direction T1 presses the second paper P2 in a movement direction T2.

The coefficient of friction between a second face P2*b* of the second paper P2 and the first face Pla of the first paper P1 is defined as a first friction coefficient μ1.

A first frictional force F1 is generated between the second face P2*b* of the second paper P2 and the first face Pla of the conveyed first paper P1. The first frictional force F1, the first friction coefficient μ1, and the pressing force W by the roller 17 have a relationship of F1=μ1×W. That is, the first frictional force F1 is a value obtained by multiplying the first friction coefficient μ1 by the pressing force W. The first friction coefficient μ1 is preferably in the range of 0.3 to 1.0.

On the other hand, as described above, the second frictional force F2 due to the second friction coefficient μ2 is generated in the direction opposite to the conveyance direction T1 between the sheet 15*a* of the first guide 15 and the first face P2*a* of the moving second paper P2.

Since the sheet 15*a* has a smaller friction coefficient than the paper P, the second friction coefficient μ2<the first friction coefficient μ1. For example, the second friction coefficient μ2 in the range of 0.05 to 0.2 is smaller than the first friction coefficient μ1 in the range of 0.3 to 1.0.

When μ2<μ1, (F2=μ2×W)<(F1=μ1×W), that is, F2<F1. Thus, the second frictional force F2 of the sheet 15*a* is smaller than the first frictional force F1. The second paper P2 easily slides on the sheet 15*a* of the lower first guide 15 with respect to the first paper P1 stacked on the second paper P2.

In the second paper P2, the second frictional force F2 is applied to the first face P2*a* in the direction opposite to the conveyance direction T1, and the first frictional force F1 is applied to the second face P2*b* in the conveyance direction T1.

Since F2<F1, the first frictional force F1 acting on the second paper P2 in the conveyance direction T1 is larger than the second frictional force F2 acting on the second paper P2 in the direction opposite to the conveyance direction T1.

As a result, a force of (F1−F2)=(μ1−μ2)×W acts on the second paper P2 in the forward direction which is the conveyance direction T1 and is the movement direction T2. The second paper P2 is pushed and moved by this force in the forward direction, which is the conveyance direction T1 and the movement direction T2, by the first paper P1 being conveyed.

More specifically, the platen roller 30 can move and push out the second paper P2 cut by the cutter 40, by conveying the first paper P1 before being cut by the cutter 40.

Figure 9:
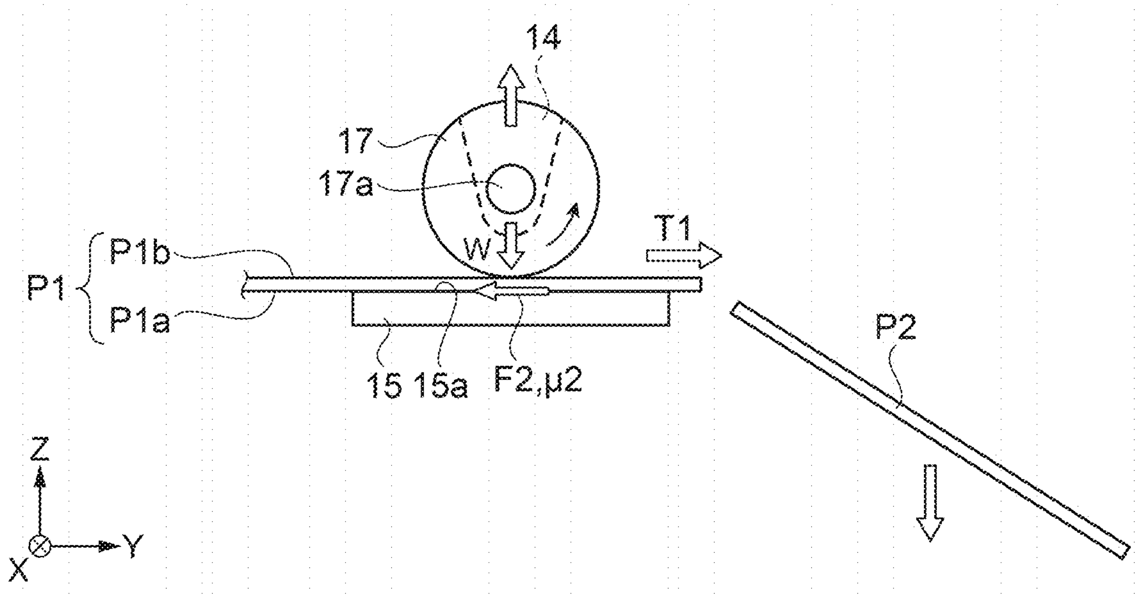
FIG. 9 is a cross-sectional view illustrating the main part of the paper guide when the first paper pushes and drops the second paper.

As illustrated in FIG. 9, when the first paper P1 is further conveyed along the conveyance direction T1, the second paper P2 is further pushed and moved. When a rear end of the second paper P2 is pushed by the first paper P1 and separates from the roller 17 and the first guide 15, the pressing force W of the roller 17 does not act on the second paper P2, and the second paper P2 drops from the first guide 15.

The roller 17 is pushed by the first paper P1 between the roller 17 and the first guide 15, and moves upward by the thickness of the first paper P1 with respect to the position shown in FIG. 4.

For example, an operator or a customer may not remove the second paper P2 issued as a receipt and held on the first guide 15. In this case, with the configuration of the paper guide 10 as described above, the second paper P2 that is not removed and remains on the first guide 15 can be dropped.

The operator or the customer can be suppressed from erroneously taking the second paper P2, which is the previously issued receipt, instead of the next first paper P1, which is the newly issued receipt.

In the roll paper printer 1 according to this embodiment described above, the paper guide 10 mounted on the cover 2 includes the first guide 15 that guides the first face Pla of the first paper P1, the roller 17 that guides the second face P1*b*, which is the opposite face to the first face Pla of the first paper P1, at a position facing the first guide 15, and the support portion 14 that can support the shaft 17*a* of the roller 17 movably.

As a result, the first paper P1 can be guided and held by the first guide 15 and roller 17. In addition, because the support portion 14 movably supports the shaft 17*a* of the roller 17, the first paper P1 can move the shaft 17*a* together with the roller 17, and can easily enter between the first guide 15 and the roller 17.

Although the embodiment has been described in detail with reference to the drawings, the specific configuration is not limited to the embodiment, and may be changed, replaced, deleted, or the like without departing from the gist of the disclosure.

The head 20 has been described as a thermal head, but the printing method is not limited. For example, the head 20 may be an ink jet head. In this case, the ink jet head contacts the platen roller 30 and cannot sandwich the first paper P1, and a driven roller that sandwiches the first paper P1 facing the platen roller 30 may be installed in the case 3. In this case, the first paper P1 may be plain paper or the like.

In the above description, the platen roller 30 and the first blade 41 constituting the cutter 40 are mounted on the cover 2, and the head 20 and the second blade 42 are mounted on the case 3, however, the cover 2 and the case 3 may mount the components in reverse. In this case, the first paper P1 is wound such that the outside of the roll paper R is the conveyance surface.

Further, the first paper P1 may be a label sheet in which labels are affixed to a base sheet at predetermined intervals.

The roll paper printer 1 may also have a storage box that stores the second paper P2 that has dropped below the paper guide 10.

What is claimed is:

1. A roll paper printer comprising:

a cover configured to pivot to open and close a case;

a platen roller configured to pull out paper from a roll paper stored in the case and convey the paper in a conveyance direction;

a head configured to print on the paper at a position facing the platen roller;

a cutter configured to cut the paper at a position downstream of the head in the conveyance direction, the cutter comprising a first blade and a second blade, one of the first blade and the second blade being configured to move with the cover pivoting to open and close the case; and a paper guide mounted on the cover, wherein the paper guide includes a first guide configured to guide a first surface of the paper, a roller configured to guide a second surface opposite to the first surface of the paper at a position facing the first guide, and a support portion configured to movably support a shaft of the roller and having a U-shape facing upward, wherein when the roller comes into contact with a sheet, the shaft of the roller is separated by a first gap from a bottom of the support portion and separated by a second gap from a side of the support portion, and the first gap is greater than the second gap.

2. The roll paper printer according to claim 1, further comprising a second guide disposed on an opposite side of the first guide with respect to the roller, wherein the support portion is provided on the first guide or the second guide.

3. The roll paper printer according to claim 1, wherein the support portion has a groove or an elongated hole that has an arc shape on a side of the first guide and has extending in a direction away from the first guide.

4. The roll paper printer according to claim 1, wherein the first guide is covered with a sheet having a smaller coefficient of friction than the paper.

5. The roll paper printer according to claim 1, wherein the platen roller is capable of moving a second paper that is cut by the cutter and positioned between the first guide and the roller, by conveying a first paper before being cut by the cutter.

6. The roll paper printer according to claim 1, wherein a paper discharge port for discharging the paper is formed between the cover and the case when the cover is closed, and the paper guide has a first opening, through which the paper discharged from the paper discharge port can be inserted, a second opening, which communicates with the first opening and through which the paper can be discharged, and a third opening, through which the paper can be discharged in a direction different from that to the second opening.

* * * * *